US011685420B2

(12) United States Patent
Martinez et al.

(10) Patent No.: US 11,685,420 B2
(45) Date of Patent: Jun. 27, 2023

(54) STEERING COLUMN ANTI-ROTATIONAL DEVICE

(71) Applicant: NSK LTD., Tokyo (JP)

(72) Inventors: Victor Corona Martinez, Ann Arbor, MI (US); Logananth Chinniah, Ypsilanti, MI (US); David Ray Hartman, Brighton, MI (US)

(73) Assignee: NSK LTD., Tokyo (JP)

( * ) Notice: Subject to any disclaimer, the term of this patent is extended or adjusted under 35 U.S.C. 154(b) by 9 days.

(21) Appl. No.: 17/614,604

(22) PCT Filed: May 29, 2020

(86) PCT No.: PCT/IB2020/000424
§ 371 (c)(1),
(2) Date: Nov. 29, 2021

(87) PCT Pub. No.: WO2020/240277
PCT Pub. Date: Dec. 3, 2020

(65) Prior Publication Data
US 2022/0219750 A1 Jul. 14, 2022

Related U.S. Application Data

(60) Provisional application No. 62/854,509, filed on May 30, 2019.

(51) Int. Cl.
*B62D 1/185* (2006.01)
(52) U.S. Cl.
CPC .................................. *B62D 1/185* (2013.01)
(58) Field of Classification Search
CPC ...................................................... B62D 1/185
See application file for complete search history.

(56) References Cited

U.S. PATENT DOCUMENTS 9,032,834 B2 * 5/2015 Inoue ..................... B62D 1/185
280/775
11,148,705 B2 * 10/2021 Ito .......................... B62D 1/187
(Continued)

FOREIGN PATENT DOCUMENTS

JP 2015-214290 A 12/2015
KR 101678191 B1 11/2016
(Continued)

OTHER PUBLICATIONS

International Search Report and Written Opinion, dated Sep. 21, 2020, for International Application PCT/IB2020/000424.

*Primary Examiner* — Drew J Brown
(74) *Attorney, Agent, or Firm* — The Dobrusin Law Firm, P.C.

(57) ABSTRACT

The present teachings relate to a spacer having a body portion and two or more opposing contact surfaces extending from the body portion, forming an angle with the body portion. The spacer may be adapted to engage with a portion of a steering column assembly to reduce or prevent rotation of a column tube during a telescoping adjustment. The teachings also include an adjustable steering column assembly having a column tube with a portion extending therefrom; a steering shaft supported for rotation at least in part by the column tube; a column housing for at least partially supporting the column tube; and the spacer. The spacer may be secured to the column tube to reduce or prevent rotation of the column tube. The teachings further contemplate a method of limiting rotational travel of a column tube during telescoping adjustment using the spacer.

20 Claims, 3 Drawing Sheets

(56) References Cited

U.S. PATENT DOCUMENTS

| | | | | |
|---|---|---|---|---|
| 2017/0072877 A1* | 3/2017 | Kakita | ................... | B62D 1/192 |
| 2018/0001845 A1* | 1/2018 | Orihara | ................... | B62D 1/187 |
| 2020/0039565 A1* | 2/2020 | Harada | ................... | B62D 1/187 |

FOREIGN PATENT DOCUMENTS

| | | | | |
|---|---|---|---|---|
| WO | WO-2016110337 A1 * | 7/2016 | .............. | B62D 1/16 |
| WO | 2018/181304 A1 | 10/2018 | | |

* cited by examiner

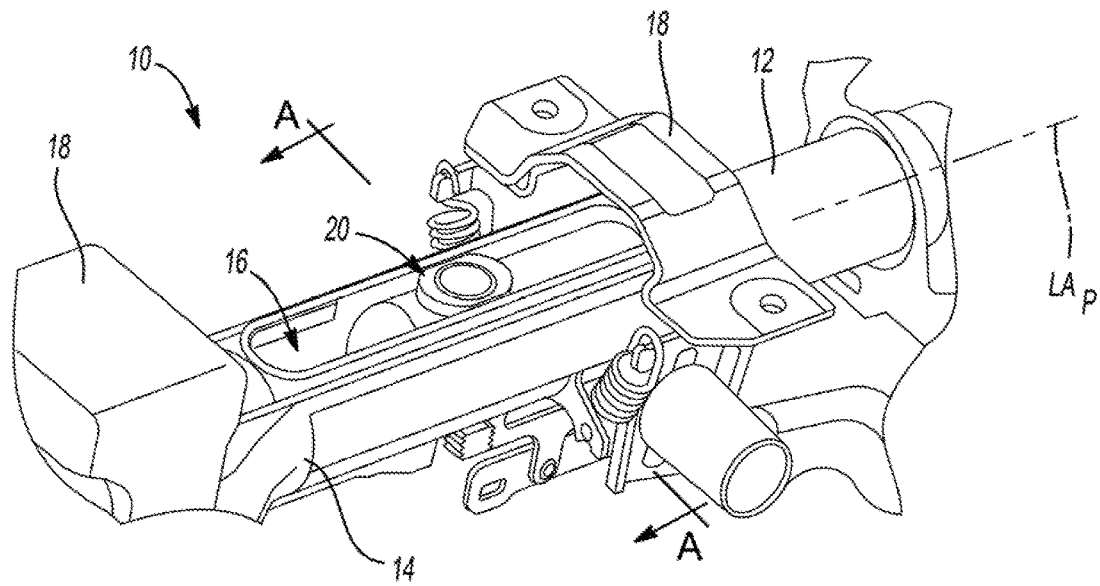
Fig-1
(Prior Art)
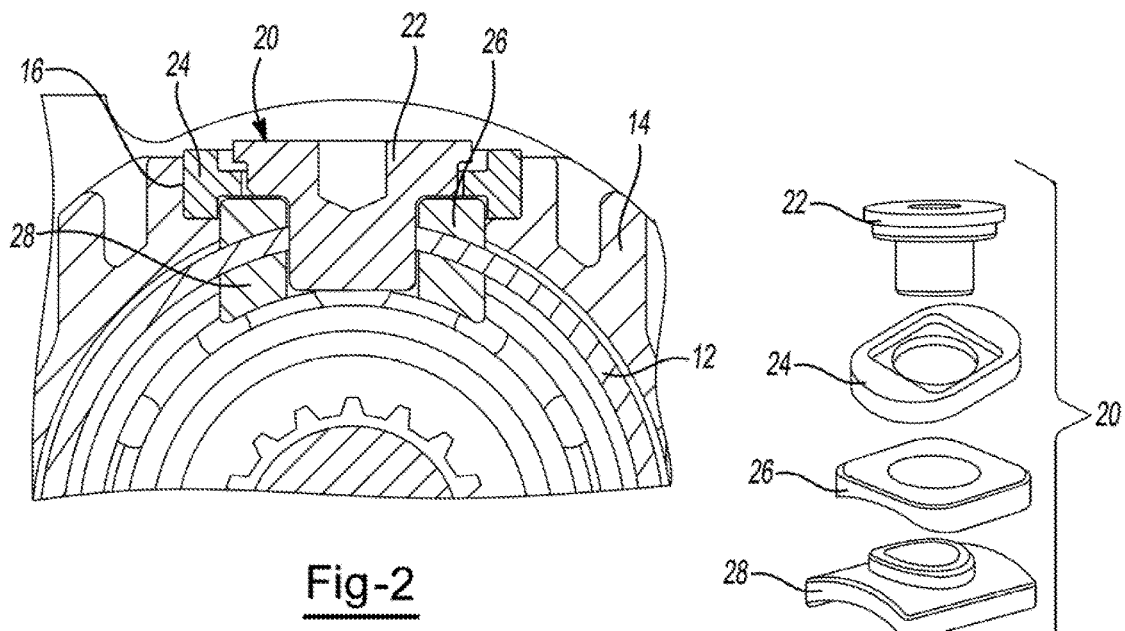
Fig-2
(Prior Art)
Fig-3
(Prior Art)

STEERING COLUMN ANTI-ROTATIONAL DEVICE

CLAIM OF PRIORITY

The present application claims the benefit of priority of U.S. Provisional Patent Application No. 62/854,509, filed on May 30, 2019, the contents of which are incorporated herein by reference in the entirety.

FIELD

In general, the present teachings relate to an adjustable steering column assembly. More particularly, the present teachings are directed to an anti-rotational device for an adjustable steering column assembly.

BACKGROUND

In the field of automotive vehicles it has become popular to employ steering column assemblies that include the ability to adjust the assemblies, such as by performing tilt and/or telescoping functions, such assemblies being known also as "rake and reach steering column assemblies." For many applications, steering column assemblies incorporate both tilt and telescopic functions. For these, it is possible to use a manual user operating device (e.g., a lever) or to employ motors to perform one or both of the functions. For example, one lever or motor may be operated to actuate the steering column assembly generally in an upward or downward vertical direction to adjust the height of a steering wheel relative to an operator of the vehicle, relative to the vehicle floor and/or vehicle ceiling, or both and thus perform the tilt function. Another lever or motor may be operated to actuate the steering column assembly to adjust the fore/aft position of the steering wheel relative to the vehicle operator. The latter typically achieves the adjustment by way of translation of a telescopic tubing arrangement by which at least one tube associated with the steering column assembly translates relative to a column housing. Industry is constantly seeking to improve these adjustment functions, such as by making the adjustment easier and/or smoother for the vehicle occupant. For example, it is desirable to have a smooth and controlled adjustment, such as by providing a guide or anti-rotational component while performing the telescoping in and/or telescoping out functions. Further, it is desirable for an anti-rotational component to be strong enough to withstand high torque loads, such as those generated in a clutch-type anti-theft key lock.

In traditional steering column assemblies, there are multiple components forming an anti-rotation subassembly to prevent the column tube from undesirably rotating during different operating conditions. These multiple components may be difficult to install, due to the required position of the elements within the steering column assembly. For example, a bracket may be positioned within a column tube. Multiple spacers may be positioned on the outer portion of the column tube. A steel bolt may penetrate a hole in the spacers and column tube and engage with the bracket to hold all of the components together. Due to the configuration of the steering column assembly, it may be necessary to insert the column tube within the column housing before the anti-rotational assembly can be installed. Due to the number of components and the positioning of these components, while the column tube is already inserted into the column housing, assembly may be complicated.

Therefore, there is a need for an improved steering column assembly that provides adjustment (e.g., telescopic adjustment, tilt adjustment, or both); that simplifies assembly; that reduces or eliminates undesirable rotation of a column tube, particularly during adjustment or where resisting torque is desired; that reduces the number of components, especially with respect to an anti-rotational assembly; or a combination thereof.

SUMMARY

The present teachings make use of a simple, yet elegant, construction approach by which relatively few components can be employed for achieving adjustment of a steering column assembly, especially telescoping adjustment. The telescoping adjustment may be generally smooth and/or may reduce or eliminate undesirable rotation of elements within the assembly (e.g., a column tube). The present teachings may make use of a simple, yet elegant approach for resisting torque, particularly high torque loads, such as those generated in a clutch-type anti-theft key lock. The present teachings meet the needs addressed above. The present teachings contemplate a spacer including a body portion and two or more opposing contact surfaces extending from the body portion, forming an angle with the body portion. The spacer may be adapted to engage with apportion of the steering column assembly to reduce or prevent rotation of a column tube during operating conditions and/or adjustment. The assembly, or components thereof, may also provide sufficient strength to react clutch-type anti-theft key lock torque.

By way of summary (without limitation) of the general teachings herein, in a general respect, the present teachings relate to a collapsing steering column assembly. The assembly includes a steering shaft support structure. For example, it may include a column housing, which may have one or more of the features as described in the present teachings. It may include a column tube which may have one or more of the features as described in the present teachings and being adapted for telescopic adjustment within the column housing. It may simply be a tube or other suitable hollow structure (e.g., the single fabricated unit integrated structure referenced above) for receiving a steering shaft. The column tube may have one or more portions projecting from its outer diameter. For example, the column tube may include one or more manufacturing extrusions. A steering shaft, which may have one or more of the features as described in the present teachings (which may support a steering wheel that is attached to it in part and may optionally be a part of the assembly), may be supported for rotation (e.g., by one or more bearings), at least in part by the steering shaft support structure and having a longitudinal axis. One or more brackets, which may have one or more features as described in the present teachings, may be employed for at least partially carrying the steering shaft support structure and attaching the assembly within a vehicle (e.g., to a cross-vehicle structure). For example, as described, the bracket may include a portion that provides a guide structure along one or more downwardly projecting walls for allowing tilt adjustment. At least one securing member, which may have one or more of the features as described in the present teachings (e.g., a tilt bolt, in the case of a tilt adjustable steering column assembly), may be employed for fixing the position of the steering shaft support structure relative to the bracket. For example, the at least one securing member may be operatively connected to an actuator or other user operating device (such as a lever or electromagnetic actuator). The at least one securing member may be operated to apply a force state (e.g., a clamping force or to create an interference fit) to help secure the steering shaft support structure in a fixed position. The assembly may allow at least a portion of the steering shaft support structure to translate forward (e.g. in a collapse stroke) upon the application of a threshold load. The threshold load may be a load of about 0.5 kN or more, or about 2 kN or more. The threshold load may be a load of about 10 kN or less, or about 5 kN or less. The threshold load may be based on a customer's specified load requirements. For example, a customer's specified load requirements may be between about 2 kN and about 5 kN. There may also be employed one or more energy absorption devices that are operable to absorb energy in response to a force applied to it at least partially due to the forward translation of the steering shaft support structure. For example, a bend plate, a wire, or the like, may be in operative engagement with the at least one securing member and with the steering shaft support structure so that energy is absorbed by way of plastic deformation of the energy absorption device. The steering shaft support structure (e.g., the column tube to which the energy absorption device is attached) may travel forward and may cause the energy absorption device to deform (e.g., plastically) so that energy from the impact is absorbed by virtue of the deformation.

The present teachings make use of a spacer (alone or in combination with other features, such as one or more portions extending from an outer diameter of the column tube) that aids in or provides for reducing or preventing rotation of a column tube of a steering column assembly. For example, this anti-rotation feature may be particularly useful during a telescoping adjustment. This anti-rotation feature may be particularly useful during torque loading. The anti-rotation feature may be strong enough to withstand high torque loads, such as those generated in a clutch-type anti-theft key lock. The spacer may include a body portion and two or more opposing contact surfaces extending from the body portion of the spacer, forming an angle. The spacer may be adapted for use within an internally collapsing steering column assembly. The spacer may be adapted to be secured to a column tube of a steering column assembly. The spacer may be adapted to be secured to or otherwise contact a portion extending from an outer diameter of the column tube. For example, the spacer may contact and/or engage with a manufacturing extrusion of the column tube. The body portion of the spacer may include an outer face adapted to be positioned away from the column tube of the steering column assembly. The body portion may include an inner face adapted to be positioned toward the column tube of the steering column assembly. The body portion may have a generally curved surface. The opposing contact surfaces may be generally parallel to each other. The opposing contact surfaces of the spacer may be adapted to engage with a portion of a column tube, a column housing, or both. The angle formed between a contact surface and the body portion may be less than 180 degrees. The angle formed may be about 75 degrees or greater. The angle formed may be about 105 degrees or less. The opposing contact surfaces may extend generally orthogonally from the body portion. The spacer may include a fastener portion to secure the spacer to a column tube. The fastener portion may extend from an inner face of the body portion of the spacer. The spacer may be formed of a polymeric and/or plastic material.

The present teachings also include a steering column assembly that includes the features described herein. The steering column assembly may include a column tube, a steering shaft supported for rotation at least in part by the column tube; a column housing for at least partially supporting the column tube; and the spacer as described herein. The column tube may include one or more features for providing strength against torque applied to the column tube. The feature may be capable of withstanding applied torque of about 10 Nm or more, about 20 Nm or more, or about 30 Nm or more. The feature may be capable of withstanding applied torque of about 350 Nm or less, about 250 Nm or less, or about 100 Nm or less. For example, the column tube may have a projection, extrusion, or other feature that extends away from the column tube for engaging with (e.g., directly or indirectly) or bearing against (e.g., directly or indirectly) another portion of the steering column assembly. The spacer may be secured to the column tube to reduce or prevent rotation of the column tube, in particular during a telescoping adjustment or during torque loading. The anti-rotation feature may be strong enough to withstand high torque loads, such as those generated in a clutch-type anti-theft key lock. The spacer may be secured to and/or positioned on the projection, extrusion, or other feature on the column tube. The steering column assembly may further include a steering wheel adjustment subassembly that includes a lever for manually actuating the steering wheel adjustment subassembly. The lever may allow for the telescoping adjustment of the steering shaft and/or column tube relative to the column housing. The body portion of the spacer may include an outer face positioned away from the column tube of the steering column assembly. The body portion of the spacer may include an inner face positioned toward an outer surface of the column tube of the steering column assembly. The inner face may contact the portion extending from the outer diameter of the column tube (e.g., the outer surface of a manufacturing extrusion). At least a portion of the inner face may contact the outer surface of the column tube. The opposing contact surfaces of the spacer may engage with a portion of the column tube of the steering column assembly. The column tube may include one or more portions extending from the outer diameter of the column tube (e.g., manufacturing extrusions) to engage with the spacer. The portions extending from the outer diameter of the column tube (e.g., manufacturing extrusions) may include one or more raised portions extending from the column tube. The portions extending from the outer diameter of the column tube (e.g., manufacturing extrusions) may include one or more channels for receiving at least a portion of the one or more contact surfaces of the spacer. The portions extending from the outer diameter of the column tube (e.g., manufacturing extrusions) may include one or more openings for receiving a fastener to secure the spacer to the column tube. The fastener maybe an integral part of the spacer, such as a plastic snap fit. The fastener may be a separate securing member, such as a screw or rivet. The one or more openings may receive the fastener portion of the spacer. The column housing may include a longitudinal slot. The portion extending from the outer diameter of the column tube (e.g., the manufacturing extrusion) may be received within the longitudinal slot. The portion extending from the outer diameter of the column tube may extend into the longitudinal slot to reduce or prevent rotation of the column tube within the steering column assembly. The opposing contact surfaces of the spacer may contact and/or engage with walls defining the longitudinal slot in the column housing to reduce and/or prevent rotation against the column tube. The opposing contact surfaces of the spacer may contact and/or engage with at least parts of the portion extending from the outer diameter of the column tube. The spacer may be installed on the column tube prior to the column tube being inserted into the column housing during assembly of the steering column assembly.

The present teachings also contemplate a method of limiting rotational travel of a column tube during telescope-in and/or telescope-out adjustment, under torque loading, or both, using the portion extending from the column tube and/or the spacer as described throughout the specification.

As can be seen, it is believed that by employment of the teachings herein it is possible to achieve adjustment of a steering column assembly, a smooth telescoping adjustment, simplicity of assembly, reduction of components, reduction or elimination of undesirable rotation of the column tube, particularly during a telescoping adjustment or under torque loading, or a combination thereof.

BRIEF DESCRIPTION OF THE DRAWINGS

FIG. 1 is a perspective view of an existing steering column assembly.

FIG. 2 is a cross-sectional view of an existing anti-rotational assembly within a steering column assembly.

FIG. 3 is an exploded view of an existing anti-rotational assembly.

DETAILED DESCRIPTION

Figure 4:
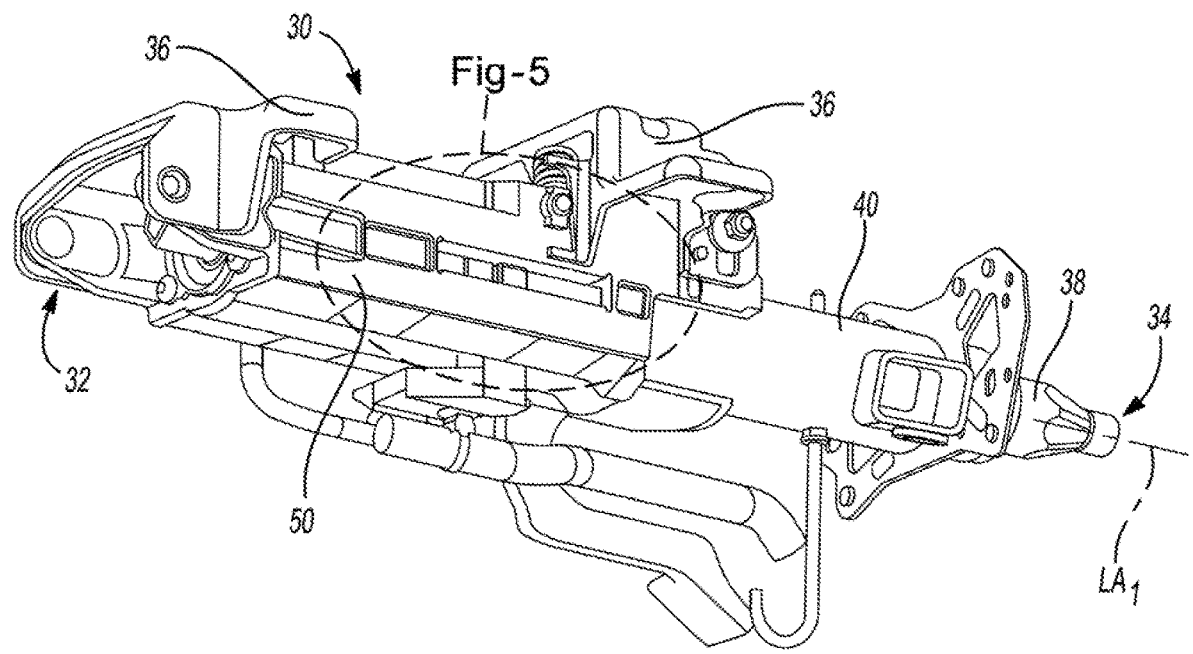
FIG. 4 is a perspective view of a steering column assembly in accordance with the present teachings.

As required, details of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

In general, the teachings herein are directed toward a unique combination of components for assisting in adjustment of a steering column assembly, and more particularly for providing elements such as those to provide for a smooth telescoping adjustment, simplicity of assembly of the steering column assembly, reduction or elimination of undesirable rotation of portions of the steering column assembly (e.g., a column tube, particularly during telescoping adjustment or under torque loading), or a combination thereof. By use of the teachings herein, it is possible to (but not limited to) limit undesirable rotation of a telescoping member during telescope adjustment of at least a portion of the steering column assembly (e.g., the column tube) when in an adjustment mode, center the column tube when the steering column assembly is in an unlocked position (e.g., not clamped, during an adjustment of the assembly), limit of rotational travel of the column tube when in an adjustment mode or when locked in position, retain the column tube longitudinally within the steering column (e.g., by resisting pull-out of the column tube from the assembly), or a combination thereof.

With more attention now to the details of the assemblies herein, they generally will include a column tube, a steering shaft, one or more brackets (e.g., a bracket structure for attachment of the steering column assembly in the vehicle, a tilt bracket, an interface bracket, or any combination thereof), a column housing, and a steering wheel adjustment subassembly (e.g., a manually or motor operated steering wheel adjustment subassembly). These elements may be discrete elements or two or more of the elements may be combined into a single unit. The column housing may be operatively connected with a bracket structure. The column housing operatively supports the steering shaft that is driven by a steering wheel. For this purpose, the column housing may itself be a tube. The column housing may provide a clamping feature, where it clamps around another portion of the steering column assembly (e.g., a column tube) when the assembly is not in an adjustment mode (e.g., tilt adjustment, telescoping adjustment, or both). The column housing may receive another tube that supports the steering shaft. One such tube, referred to herein as the column tube, may have a hollow cavity along at least a portion of (if not the entirety of) the length of the tube and may be sized and configured to receive and support a rotatable shaft, namely a steering shaft and possibly one or more bearings. Both the steering shaft and any tube (be it a column housing, a column tube, or both) will have a longitudinal axis. When installed in a vehicle, the longitudinal axis of each the shaft and any tube may be generally coaxially aligned, aligned generally parallel with a longitudinal axis of a vehicle (e.g., within about 10° or even about 5°), or each. The longitudinal axis of each of the shaft and any tube may form an angle with the longitudinal axis of a vehicle of about 45° or less, about 30° or less, or about 25° or less. The steering shaft, the column housing and any column tube may be made of a suitable metal, such as steel or aluminum. Metal components herein may also be made of other metals, such as magnesium. Such metals may be alloys. However, generally pure metals are also possible. The steering wheel adjustment subassembly may include a lever (or any other user operating device) adapted for actuating (e.g., manually actuating) the subassembly, and at least one engagement member that is brought into and out of engagement with the column tube for selectively locking the steering shaft into a position desired by a user.

The teachings, in general, also envision the possible use of one or more energy absorption devices. The energy absorption devices may be a suitable device adapted to deform elastically and/or elastically and plastically. In the course of deforming, the energy absorption devices are thus adapted to absorb energy by way of the deformation. The energy absorption device may be operatively connected or located between or among two or more components. It may be configured so that it limits relative movement as between or among two or more components. The energy absorption devices may be wires, plates or the like. They may have a constant profile or a varying profile along their length. They may be employed to have one or more fixedly constrained portions (e.g., an end). They may have one or more free ends.

The assembly herein may further employ an energy absorption structure of the type described in U.S. Publication Nos. 2013/0233117 and 2017/0247047, or International Application Nos. PCT/US2017/053583 and PCT/US2017/053711, the entirety of which are incorporated by reference herein for all purposes. For instance the assembly herein may include at least one plastically deformable energy absorption device (e.g., a bend plate, a wire, or some other structure adapted to be carried at least partially by the column housing, column tube, or both), wherein the energy absorption device, when employed, absorbs energy by plastic deformation during the secondary impact after the steering shaft support structure (e.g., column tube and steering shaft) starts to translate along the column housing. Any plastically deformable energy absorption device may thus limit the extent of longitudinal travel of the column tube, steering shaft, or both.

One or more suitable brackets may be employed. Any such bracket may include a portion for mounting the steering column assembly within a vehicle (e.g., it can be secured to a vehicle structure, such as a cross vehicle beam, instrument panel, or otherwise). The bracket may have a portion that at least partially adjoins the steering shaft support structure (e.g., the column tube, the column housing or both). For example, a bracket may include one or a plurality of downward depending (downwardly oriented) walls (e.g., tilt plates) that define a tilt portion of the bracket. One or more of the downward depending walls (e.g., tilt plates) may be adapted to provide a structure that has an elongated slot that provides guidance for the tilt function (e.g., it provides a guide path for a securing member such as a tilt bolt as it travels during adjustment; it may thus limit upward and downward travel). The bracket may be an integrated structure so that the tilt portion and the mounting portion are a single structure (e.g., a casting, a stamping, or a combination thereof). The bracket may be made of separate structures that are assembled together to define the mounting and tilt portions in a single structure. The mounting portion may be omitted and/or may be located elsewhere within the steering column assembly. The tilt portion may be omitted. A mounting bracket may be employed separately from a structure defining a tilt portion. Examples of brackets that may be employed, in addition to the examples described herein, include those of United States Published Application No. 20100300238 (the entirety of which is incorporated by reference for all purposes: see, e.g., description of bracket 20); U.S. Pat. No. 6,467,807, the entirety of which is incorporated by reference for all purposes (see, e.g., description of brackets 6 and 7 and associated structure).

One or more brackets (e.g., tilt brackets) may be employed and adapted for receiving at least a portion of a steering shaft support structure (e.g., at least a portion of the column tube, the column housing, or both), and/or for mounting the steering column assembly within the automotive vehicle. By way of example, a tilt bracket of the present teachings may include an upper portion that is adapted to be secured to a vehicle structure, such as a cross vehicle beam, instrument panel, or otherwise. The bracket (e.g., tilt bracket) may have a pair of generally opposing downwardly oriented or projecting walls (e.g., tilt plates). The bracket (e.g., tilt bracket) may have a structure that at least partially flanks at least a portion of the steering shaft support structure (e.g., the column tube). The bracket (e.g., tilt bracket) may include a pair of opposing side walls, and an upper wall that is configured to attach to the vehicle (e.g., to a cross vehicle beam, an instrument panel, or other suitable structure). The side walls may project outward relative to the upper wall (e.g., they may be generally orthogonally or obliquely disposed relative to the upper wall). The bracket (e.g., tilt bracket) may have a single downwardly projecting or oriented wall. The bracket (e.g., tilt bracket) may be disposed laterally above and outward relative to an opposing portion of the column housing.

One or more bracket structures may be a cast structure (e.g., structure made by casting a mass), a forged structure (e.g., a structure made by forging a metal mass), a machined structure, a consolidated structure (e.g., a structure made by a step of sintering and/or pressing a powder metal mass), or any combination thereof. One approach is to cast the bracket structure to form a metal casting (e.g., an aluminum alloy, magnesium alloy, or a ferrous metal casting). The bracket structure thus may be configured for integrating functions of mounting within a vehicle and accommodating a tilt function of the assembly relative to a vehicle operator. For instance, the functions may be integrated into a single bracket, or spread among separate bracket components.

As mentioned, the steering column assembly of the present teachings may include one or more steering wheel or steering column adjustment subassemblies. For example, an adjustment subassembly may provide a user with the ability to adjust the steering wheel (and thereby the steering shaft) in a fore and/or aft direction (e.g., telescopic adjustment). An adjustment subassembly may provide a user with the ability to adjust the position by raising and lowering the steering wheel, and thereby the steering shaft (e.g., tilt adjustment), relative to the user. The steering column assembly may provide the ability to perform either or both of these functions (e.g., telescopic adjustment and/or tilt adjustment). These functions may be accomplished by one adjustment subassembly or more than one adjustment subassembly (e.g., one adjustment subassembly for providing telescopic adjustment and one adjustment subassembly for providing tilt adjustment).

An adjustable telescoping subassembly may be employed for selectively driving the steering shaft in a fore and/or aft direction generally along the longitudinal axis of the steering shaft. In general, the adjustment of the telescoping subassembly may be controlled by a suitable user operating device (e.g., a lever, an electromechanical actuator, or otherwise). For a manually operated system, a lever or other user operating device may be adapted to control a force applied to maintain the collapsing portion in a user selected position. For example, a lever or other user operating device may be in operative engagement with one, two, or more clamping portions or other suitable mechanism to releasably (and possibly adjustably as well) secure two or more components of the collapsing portion together. Clamping or other securing may be realized by a suitable securing member (e.g., an elongated force applying member), such as an elongated member, bolt (e.g., a tilt bolt), pin, rod, strap, bar, band, wedge, or other suitable member. For instance, the securing member may be adapted, upon actuation of the user operating device to cause generally opposing portions (e.g., damping portions) to separate or come closer together such as, respectively, for releasing the components relative to each other or for securing the components relative to each other.

In the alternative, the teachings may include employing at least one telescoping motor subassembly adapted for selectively driving the steering shaft (by way of a rod or other drive member) in a fore or aft direction generally along the longitudinal axis of the steering shaft. The telescoping motor subassembly may include an electric motor that has a motor shaft that operatively drives a drive member (e.g., a rod that is threaded or has gear teeth over at least a portion of its length). The shaft may drive the drive member by use of one or more gears. It may drive the drive member by way of a threaded nut. The motor shaft may have a longitudinal axis that is oriented generally parallel with the longitudinal axis of the steering shaft and/or inner tube. The motor shaft may have a longitudinal axis that is oriented generally transverse with the longitudinal axis of the steering shaft and/or inner tube. The telescoping motor subassembly may be such that it includes a housing within which the motor is at least partially located. The housing may include one or more flat surfaces that are adapted to slidingly bear against another surface (e.g., a bracket, a flange of the column housing, or some other mounting structure), which other surface may be part of, or be operably connected with the column housing. Such flat surfaces may be a part of a mounting structure for securing the telescoping motor subassembly to the overall assembly.

The teachings may further contemplate employing at least one tilt subassembly that is adapted for selectively raising or lowering the steering shaft. The optional tilt subassembly may be manually actuated, motorized, or both. It may be attached (e.g., at a first mount location along its length) to the bracket structure. For example, as discussed, it may be incorporated within a housing structure (e.g., a column housing) defined in the bracket structure. It may be attached at a second location along its length (e.g., at a second mount location that is distal from the upper surface of the bracket structure as compared with the first mount location).

As indicated, a column housing may be pivotally coupled with the bracket structure (e.g., at a forward end of both the bracket structure and the column housing) and is adapted to permit steering shaft adjustment (e.g., tilt adjustment, telescopic adjustment or both, such as by way of the tilt subassembly, telescoping subassembly, or both). The column housing may be a cast structure (e.g., a structure made by casting a mass), a forged structure (e.g., a structure made by forging a metal mass), a machined structure, a consolidated structure (e.g., a structure made by a step of sintering and/or pressing a powder metal mass) or any combination thereof. One approach is to cast the column housing to form an aluminum alloy casting. The column housing may include one or more ribs. The column housing may be generally elongated. It may have a substantially cylindrical configuration. The column housing may have a portion that is capable of receiving a substantially cylindrical part, such as a column tube. The column housing may have a lower portion that has laterally projecting flanges over at least a portion of the column housing length. The flanges may project from both sides of the column housing. The flanges may project laterally outward to a location that extends beyond the outermost reach of the wall from which it projects. The column housing may have one or more openings, e.g., slots or a gap, for exposing the column tube so that the column tube can be connected with and translate longitudinally (e.g., associated with the telescoping subassembly). The one or more openings, such as slots or a gap, may be adapted to receive another portion of the steering column assembly, such as a portion of the column tube.

The column tube may include one or more features extending from the outer diameter of the column tube. These one or more features may serve to engage with and/or contact one or more other features within the steering column assembly. These one or more features may be integral with the column tube. The feature extending from the column tube may function to contact and/or engage with one or more portions of the steering column assembly to reduce or prevent undesired rotation of the column tube within the assembly. The feature may serve as an anti-rotational feature. For example, the column tube may include one or more projections, extensions, or other feature (e.g., a manufacturing extrusion) that extends into a slot or opening of the column housing, engages with the walls defining the slot or opening of the column housing, or both. The projection, extension, or other feature may be a shape capable of fitting within the slot or opening of the column housing. The shape may be such that it is able to translate within the slot during telescope adjustment. The projection, extension, or other feature, may provide for translation along a longitudinal axis parallel to or coaxial with the longitudinal axis of the slot of the column housing. The projection, extension, or other feature, may reduce or prohibit radial or rotational movement of the column tube about its longitudinal axis. The projection, extension, or other feature may act to transmit torque from the column tube to the slot or opening of the column housing. The projection, extension, or other feature may interact with the column housing and be able to withstand forces and/or torque exerted upon it without breaking. The projection, extension, or other feature may be capable of withstanding forces of about 10 N or more, about 20 N or more, or about 30 N or more. The projection, extension, or other feature may be capable of withstanding forces of about 100 N or less, about 250 N or less, or about 350 N or less. The projection, extension, or other feature may be capable of withstanding torque of about 10 Nm or more, about 20 Nm or more, or about 30 Nm or more. The projection, extension, or other feature may be capable of withstanding torque of about 100 Nm or less, about 250 Nm or less, or about 350 Nm or less.

Telescoping of the column tube, steering shaft, steering wheel, or a combination thereof may be eased or further eased by the use of a spacer secured to a portion of the steering column assembly. For example, a spacer may be secured to the column tube and may be permitted to translate fore and aft along a portion of the column housing as the column tube is translated fore and aft. The spacer may be located upon the projection, extension, or other feature extending from the outer diameter of the column tube (e.g., the manufacturing extrusion).

The spacer, the portion extending from the outer diameter of the column tube, or both, may provide for a smooth telescope feeling (e.g., through interactions with other elements of the steering column assembly, such as a longitudinal slot of a column housing). The spacer, the portion extending from the outer diameter of the column tube, or both, may serve as an anti-rotational feature for the column tube, such as during telescoping adjustment. The spacer, the portion extending from the outer diameter of the column tube, or both, may constrain undesirable looseness, such as during telescoping adjustment. The anti-rotational feature may be useful during torque loading. The anti-rotational feature may be strong enough to withstand high torque loads, such as those generated in a clutch-type anti-theft key lock. The spacer may be a single, unitary piece. The spacer, the portion extending from the outer diameter of the column tube, or both, may eliminate the need for additional members or anti-rotational features, thereby simplifying the anti-rotational features, assembly, the like, or a combination thereof. The spacer, the portion extending from the outer diameter of the column tube, or both, may be formed of any material capable of withstanding forces to which it would be subjected during a telescoping adjustment, during torque loading, or both. The spacer, for example, may be formed of a polymeric material, a plastic material, polyoxymethylene, nylon, glass-filled, nylon, the like, or a combination thereof.

The spacer may include a body portion. The body portion may be adapted to be received within a slot or window in the column housing. The body portion may provide stability to the spacer. The body portion may join additional elements of the spacer (e.g., one or more fastener portions, one or more contact surfaces, or both). The body portion may have any shape that generally allows the spacer to perform its intended function (e.g., to act as an anti-rotational device for the column tube, to provide a smooth telescoping operation, and the like). The spacer may have additional geometry to incorporate additional functions or features, such as shroud or wire harness attachment locations. The body portion may have one or more generally straight edges. The body portion may have a generally rectangular shape. The body portion may have one or more curved edges. The body portion may be generally planar and/or may have a generally planar profile. The body portion may be generally curved and/or have a generally curved profile. The body portion may include one or more generally planar segments or profile segments. The body portion may have any shape and/or profile that allows the spacer to be secured to the column tube. The body portion may have a profile that generally matches the outer diameter of the column tube.

The body portion may include a plurality of faces. The body portion may include an outer face that faces away from the column tube, toward the column housing, or both. At least a portion of the outer face may be visible through a hole or slot in the column housing. The body portion may include an inner face. The inner face may be generally parallel to the outer face. The inner face and outer face may be not parallel. The inner face may have a different shape from the outer face. For example, the outer face may be generally planar or flat, while the inner face may be generally curved. The inner face may be located generally opposite the outer face. The inner face may be adapted to face the outer diameter of the column tube or a portion extending therefrom, such as an extension, projection, or other feature extending from the outer diameter of the column tube, such as a manufacturing extrusion. At least a portion of the inner face may be adapted to contact the outer surface or outer diameter of the column tube or a portion extending therefrom, such as an extension, projection, or other feature extending from the outer diameter of the column tube, such as a manufacturing extrusion. At least a portion of the inner face may have a generally complementary shape to the column tube or the portion of the column tube to which it is attached and/or contacts. For example, if the column tube is a generally cylindrical tube, the inner face may be shaped to wrap at least partially around the column tube, thereby having a generally curved surface, if the portion of the column tube extending from the outer diameter of the column tube has a generally curved surface, the inner face may be shaped to wrap at least partially around the portion of the column tube to which it attaches and/or contacts. The inner face may include one or more features for engaging with the column tube. For example, one or more projections or fasteners may extend from the inner face of the body portion to engage with a portion of the column tube. The inner face, the outer face, or both, may include one or more openings (e.g., for receiving a fastener, a projection extending from the column tube, or the like).

The spacer may include one or more contact surfaces extending from the body portion of the spacer. The contact surface may extend from an edge of the body portion. The contact surface may extend at an angle from the body portion of the spacer. The contact surface may form an angle with the body portion of about 45 degrees or greater, about 60 degrees or greater, about 75 degrees or greater, or about 90 degrees or greater. The contact surface may form an angle with the body portion of less than about 180 degrees. The contact surface may form an angle with the body portion of about 150 degrees or less, about 135 degrees or less, about 120 degrees or less, or about 105 degrees or less. The contact surface relative to the body portion may be flexible and/or resilient. The contact surface may be permitted to flex relative to the body portion. Such flexing may be helpful, for example, when installing the spacer to a column tube. The spacer may include one or more features that allow the spacer to flex, such as one or more thinned areas (e.g., where the contact surface joins the edge of the body portion).

The contact surface may have any shape, profile, or configuration that allows the spacer to contact the column tube (e.g., portion extending from the column tube, such as an extension, projection, or other feature extending from the outer diameter of the column tube, such as a manufacturing extrusion), a portion of the column housing (e.g., a wall defining a longitudinal slot of the column housing), or both. Exemplary shapes include rounded, square, rectangular, polygonal (e.g., hexagonal), portions having one or more straight edges, portions having one or more curved portions, or a combination thereof. The contact surface may extend along an entire edge of the body portion of the spacer. The contact surface may extend over only a portion of the edge of the body portion of the spacer. The contact surface may be generally planar. The contact surface may be generally continuous. The contact surface may have one or more voids, gaps, or spaces. The contact surface may have a generally forked shape. The contact surface may be generally smooth. The contact surface may have one or more ribs, barbs, bulbous portions, textures, frictional surfaces, teeth, the like, or a combination thereof. The free end of the contact surface may be any shape capable of engaging with the column tube. The free end may be generally straight, generally curved, have one or more angled portions, one or more voids, the like, or a combination thereof.

The spacer may include one or more fastener portions extending from the spacer. The one or more fastener portions may extend from the inner face of the spacer. The one or more fastener portions may be generally parallel to one or more contact surfaces. The one or more fastener portions may be generally perpendicular to the body portion, the longitudinal axis of the column tube, or both. The one or more fastener portions may function to secure the spacer to the column tube (e.g., by engaging with a feature of the column tube such as an opening). The one or more fastener portions may be received within a feature of the column tube, such as by friction fit or press fit, to secure the spacer to the column tube. The fastener portion may be any shape capable of being received within and/or engaging with a portion of the column tube. For example, the fastener portion may be a Christmas tree fastener, ball fastener to be received within a socket, snap, pin, the like, or a combination thereof.

Instead of, or in addition to, a fastener portion extending from the inner face to engage with the column tube, a separate fastener is also contemplated. For example, the body portion of the spacer may include an opening for receiving a fastener that is adapted to engage with a portion of the column tube. Such fasteners may include screws, bolts, pins, rivets, Christmas tree fasteners, press-fit fasteners, the like, or a combination thereof.

The portion extending from the column tube, such as an extension, projection, or other feature extending from the outer diameter of the column tube may include one or more features for engaging with the spacer of the present teachings. The column tube may include one or more manufacturing extrusions for receiving or engaging with portions of the spacer. The manufacturing extrusion may include a raised portion that extends from the outer surface of the column tube to contact the inner face of the column tube. The column tube may include one or more channels for receiving a portion of a contact surface of the spacer. The channels may be a complementary shape to the contact surface. For example, if a contact surface has a toothed free end, the channel may have a complementary toothed portion for engaging with the contact surface. The channels may have one or more ribs, barbs, or other features for preventing pullout of the contact surface during normal operations. The channels may be of a sufficient depth that the contact surface is stabilized and/or will not slide out during normal operations. The channels may be the entire thickness of the tube. The thickness of the channels may be about 1 mm or more, about 1.25 mm or more, or about 1.5 mm or more. The thickness of the channels may be about 5 mm or less, about 4.5 mm or less, or about 4 mm or less. The channel may react to the torque input into the column tube. For example, the torque may be about 250 Nm for a clutch-type anti-theft key lock. The column tube may include one or more openings for receiving a fastener to secure the spacer to the column tube. For example, the column tube may include an opening for receiving and/or engaging with the fastener portion of the spacer extending from the inner face.

The column housing of the steering column assembly may include one or more features for accommodating the spacer secured to the column tube and the portion extending from the column tube, such as an extension, projection, or other feature extending from the outer diameter of the column tube, such as a manufacturing extrusion. The column housing may include a longitudinal slot. The slot of the column housing may have a height that is greater than the height of the spacer the portion extending from the outer diameter of the column tube, or both. The slot of the column housing may have a height that is generally equal to the height of the spacer. The slot of the column housing may have a height that is smaller than the height of the spacer. The walls defining the longitudinal slot may be adapted to contact a portion of the spacer, the portion extending from the outer diameter of the column tube, or both, such as during a telescoping adjustment or during torque loading. The slot may assist in guiding translation fore and aft of the column tube during a telescoping adjustment. For example, during a telescoping adjustment, the spacer, the portion extending from the outer diameter of the column tube, or both, may contact one or more walls defining the longitudinal slot, thereby guiding the direction of travel in a longitudinal direction. The slot, through contact with the spacer, the portion extending from the outer diameter of the column tube, or both, may prohibit rotational movement of the column tube about the longitudinal axis of the column tube. The walls defining the height of the slot may act as a telescope stop for the steering column assembly to stop further telescoping in or out. The longitudinal slot may be configured in such a way that the portion extending from the outer diameter of the column tube can be received or installed within the longitudinal slot. When the spacer is assembled on the column tube, it is contemplated that the column tube or the extension therefrom will not be permitted to pass back through the column housing (e.g., at the longitudinal slot) without forces being applied thereto. For example, the column tube or portions extending therefrom may not be permitted to be removed from the slot without a force applied of about 1 kN or greater, about 2 kN or greater, or about 3 kN or greater.

The column housing may include an indentation located at or near an opening of the column housing (e.g., at the rear opening). The indentation may allow the column tube and spacer to be slid into and/or received within the column housing. The indentation may ease assembly of the column housing, as it may allow the spacer to be installed on the column tube prior to the column tube being inserted into the column housing. The indentation may be any shape that allows the spacer, the portion extending from the outer diameter of the column tube, or both, to pass into the column housing while attached to the column tube.

During adjustment of the steering column assembly, such as by telescoping, the spacer, the portion extending from the outer diameter of the column tube, or both, may be permitted to slide within the longitudinal slot of the column housing as the column housing translates fore or aft. A portion of the spacer (e.g., the contact portions), the portion extending from the outer diameter of the column tube, or both, may directly and/or indirectly contact a wall defining the longitudinal slot of the column housing. For example, the spacer may directly contact the wall, while the portion extending from the column tube may indirectly contact the wall (i.e., with the spacer therebetween). The contact between the spacer and the wall defining the longitudinal slot may guide the translation of the column tube along the longitudinal axis. The direct or indirect contact between the spacer, the portion extending from the outer diameter of the column tube, or both, and the wall may prevent the column tube from rotating about the longitudinal axis. The axial slot may further act as a telescope stop during telescoping adjustment. For example, a portion of the spacer, the portion extending from the outer diameter of the column tube, or both, may contact a fore or aft wall of the slot (i.e., a wall defining the height of the slot) during telescope-in or telescope-out of the column tube, thereby acting as a stop and prohibiting further movement of the column tube along the longitudinal axis in a particular direction.

The column housing may be in clamping relation with the column tube so as to permit steering shaft adjustment (e.g., telescoping, tilt, or both). For example, the column housing may be unclamped during adjustment of the steering shaft and/or column tube. The column tube may be clamped by the column housing when the steering shaft and/or column tube are in the desired position. The column housing, a bracket structure, and/or the column tube may include a structure adapted for clamping the column tube into position (e.g., via a lever or other user operating device). The column housing may at least partially surround the column tube in a relation that may be adapted for clamping or unclamping with the column tube (e.g., when the lever or other user operating device is in a predetermined position) so as to permit steering shaft tilt adjustment, telescoping adjustment, or both. The column housing may include a suitable structure for releasably clamping or otherwise engaging the column tube into position. For example, the column housing may include an elongated longitudinally oriented opening (e.g., an axial slot) that defines an inner surface structure that may include opposing inner surfaces (e.g., wall surfaces) that can be urged toward the column tube for clamping the column tube into position (e.g., by using the lever to apply a clamping force, such as by way of a tilt bracket).

The position of the column tube relative to the column housing may be fixed by way of a securing member that is located in a secure engagement position and applies a force (e.g., a generally transverse force relative to the longitudinal axes of the column tube and the column housing) to at least one of the column housing or column tube for causing a secure engagement of the column tube and the column housing (e.g., a clamped engagement, an interference, interlock, detent, or other mechanical engagement). The securing members may cause a portion of the column housing (e.g., inner walls of the column housing) to clamp onto the outer diameter column tube, thereby securing the column tube in a desired position (e.g., a desired telescope position, tilt position, or both). Securing members may include an elongated force applying member, such as a bolt (e.g., a tilt bolt), rod, strap, bar, band, wedge, or other suitable member. For example, the securing member may be adapted, upon actuation of the lever or other user operating device to cause generally opposing portions (e.g., clamping portions) to separate or come closer together, respectively, such as for releasing components relative to each other or for securing the components relative to each other. When in an unclamped and/or unlocked position, the width of the axial slot of the column housing may change (e.g., a wider slot when unlocked to permit adjustment; a narrower slot when locked to hold the column tube in proper position). Therefore, the user may be permitted to adjust the position of the steering wheel (e.g., telescoping adjustment), while the column tube is unclamped.

Instead of, or in addition to clamping the column housing around the column tube, the assembly may include a steering wheel adjustment subassembly having a lever (as discussed, or some other user operating device) adapted for actuating (e.g., manually actuating) the subassembly via tilt, telescoping, or both. At least one engagement member (e.g., a pin) may be brought into and out of engagement with the column tube or a structure secured thereto for selectively locking the steering shaft into a position (e.g., telescoped position) desired by a user (e.g., via the lever). One or more cams may be brought into and out of engagement (e.g., via interference) with a wall of a tilt plate defining a vertical slot for adjustment of the tilt position desired by a user (e.g., via the lever). A mounting structure may detachably mount the steering wheel adjustment subassembly relative to the bracket (e.g., tilt bracket). During an impact such as a secondary impact, the column housing may remain in a generally fixed position relative to a forward pivot mounting location (e.g., any forward translation is limited to a relatively small amount (e.g., about 50 mm or less, about 20 mm or less, or about 10 mm or less)).

The assembly may include a tilt bracket having one or more tilt plates or two or more tilt plates extending downwardly on opposing sides of the column tube, column housing, or both. The tilt plates may include one or more generally vertical slots. A tilt bolt or other elongated fastener may extend through the tilt plate or between the two tilt plates, and the tilt bolt may be received within the vertical slots. The height adjustment of the assembly may be possible by the tilt bolt moving upwardly or downwardly in the slots when the user operating device, such as a lever, is in an unlocked position. The assembly may be held at the desired angle or height when the user operating device, such as a lever, is moved into the locked position.

To lock the assembly at a desired height or angle relative to the driver, the user operating device, such as a lever, may operate a cam locking system. A cam may be located within either or both of the vertical slots of the opposing tilt plates in the tilt adjustment assembly. The cam may be generally oblong or tear shaped, for example. The cam may engage (e.g., via cam teeth) with a wall defining the slot of the tilt plate when the lever or other user operating device is in a locked position. A spring may be keyed to the tilt bolt and attached to the cam so that when the lever is locked, the spring pushes or rotates the cam so the teeth contact the tilt plate (e.g., at a wall defining the slot). Due to the shape of the cam, when the lever is in an unlocked position, the cam may disengage from the wall defining the slot of the tilt plate (and the teeth may be clear of the surface), and the cam and tilt bolt may be permitted to move freely upwardly or downwardly within the slot to adjust the height and angle of the steering wheel for the driver or user.

Instead of, or in addition to, a clamping relationship between the column housing and the column tube, the telescope adjustment assembly may serve to absorb energy during an impact, such as a secondary impact. The telescope adjustment assembly may include an energy absorption plate. The energy absorption plate may function to secure the position of the column tube, steering shaft, steering wheel, or a combination thereof in a desired fore or aft direction. The energy absorption plate may serve to absorb energy, particularly during the forward telescoping of the column tube when a load exerted on the steering wheel exceeds a threshold load (e.g., during a secondary impact). The energy absorption plate may include two or more generally planar sections that are generally parallel to each other and joined at an arcuate portion (e.g. an arcuate portion pointing generally forward). One of the generally planar sections may be fixedly attached to the column tube, the column housing, or both (e.g., via one or more fasteners such as screws, rivets, or pins; via one or more adhesives; via one or more methods such as soldering or welding; or a combination thereof).

The other generally planar section may be positioned away from the column tube. The generally planar section may be secured to or engage with another portion of the steering column assembly, such as the column housing, a portion of the adjustment subassembly, or both. This generally planar section may provide an area for engaging a fastener to lock the column tube in place telescopically. As an example, the generally planar section may include a toothed portion (e.g., a slot defined by a plurality of teeth). In another example, the generally planar section may include a series of openings adapted for receiving a fastener, where the opening chosen to receive the fastener impacts the position of the steering shaft telescopically (i.e., a pin in a more forward opening may secure the column tube in a forward direction, whereas a pin toward the rear opening in the generally planar section may secure the column tube closer to the driver or user).

The generally planar section facing away from the column tube may engage with a spring-biased fastener, such as a pin. The spring-biased fastener may be actuated by the lever of the steering column assembly. The fastener may be inserted through an opening in the column housing and/or tilt plate and may be positioned generally perpendicularly to the column tube. When the spring-biased fastener is pushed or when pressure is applied (i.e., the spring is compressed), the tip of the fastener may be caused to engage with the generally planar section. Where the generally planar section includes a slot defined by a plurality of teeth, these teeth may engage with a toothed end of a pin to provide locking engagement to prevent further movement of the column tube in a fore or aft direction. The pressure or compression of the spring-biased fastener may be provided by a portion of the lever or other user operating device. As such, the lever or other user operating device may also allow the user or driver to control the telescoping adjustment of the steering column assembly in a fore and aft direction. The lever may include a ramp portion, or an angled segment facing the column tube and/or column housing. When the lever is in a locked position, the ramp portion may contact the head of the spring-biased fastener, such as a pin, thereby pushing the pin toward the column tube. When the lever is in an unlocked position, the spring-biased fastener may be released, and as the spring returns to an uncompressed state, the tip or end of the fastener is removed from engagement with the generally planar section (e.g., the toothed portion), and a user is free to pull or push the steering wheel to adjust the position telescopically. Alternatively, the pin may be pushed and pulled by the lever and/or by a cam associated with the lever so that the pin is not bound in place by pressing on the column tube.

As mentioned, the energy absorption plate may provide for energy absorption in the event of an impact occasioning a collapse stroke where a portion of the steering column assembly (e.g., the column tube, steering shaft, steering wheel, or a combination thereof) is caused to translate forward, away from the user. As the column tube translates forward, the portion of the energy absorption device attached thereto travels forward with the column tube. This may cause deformation of the energy absorption device. It is contemplated that the generally flat portion of the energy absorption plate facing away from the column tube may remain fixed (e.g., due to its engagement with a portion of the column housing or a portion of the adjustment subassembly, such as the spring-biased fastener, such as a pin). It is contemplated that one or more portions of the assembly may break away upon exceeding a threshold load. For example, the pin (or other portion of the telescope mechanism) may be made to break upon application of a prescribed load, especially in the event that the steering column is in the unlocked position (e.g., during a crash). The energy absorption plate attached to the column tube may help absorb energy, typically by plastic deformation (e.g., as the first generally flat segment is held in place by the pin and as the second generally flat segment moves with the column tube). As a result of the force of the column tube translating forward, with the energy absorption plate secured thereto, the plate may plastically deform. For example, it may deform without plastic elongation, without plastic compaction, without plastic buckling or any combination thereof. The forward end of the column housing may remain fixed in place, or otherwise be limited in the extent of forward travel (e.g., in an amount of less than about 50 mm, 20 mm or 10 mm).

It is contemplated that energy absorption can be enhanced, or a greater load may be withstood when the steering column assembly includes an actuator, such as a pyrotechnic actuator. It is also contemplated that energy absorption can be enhanced with the addition of another energy absorption plate. For example, another energy absorption plate can be wrapped around the energy absorption plate as described herein. Therefore, the energy absorption plates can be in a nesting configuration. The actuator, such as the pyrotechnic actuator, may include a blocking member or pin that abuts, engages with, or contacts a portion of an energy absorption plate. The actuator may include a pin or other member that may penetrate one or both energy absorption plates (i.e., the inner energy absorption plate and the outer energy absorption plate). With the actuator pin penetrating or otherwise engaging with, and thereby coupling, one or more energy absorption plates, the plates may be adapted to move (e.g., together) upon the forward translation of the column tube, as the actuator acts to fix the energy absorption plates. If the actuator pulls back the blocking member or pin, the inner plate may function as the energy absorption plate during an impact (e.g., a secondary impact), due to being connected to the column tube as well as being in engagement with the pin at the first generally flat portion, while the outer plate moves freely with the column tube.

It is contemplated that the spacer and/or steering column assembly described herein may have any of the following features, in any combination: the spacer may ne adapted to be secured to a column tube of a steering column assembly; the body portion may include an outer face adapted to be positioned away from a column tube of a steering column assembly; the body portion may include an inner face adapted to be positioned toward a column tube of a steering column assembly; the body portion may have a generally curved surface; the opposing contact surfaces may be generally parallel to each other; the two or more opposing contact surfaces may be adapted to engage with a portion of a column tube of a steering column assembly, a column housing of a steering column assembly, or both; the angle formed between one contact surface and the body portion may be less than 180 degrees; the angle formed may be about 75 degrees or greater; the angle formed may be about 105 degrees or less; the opposing contact surfaces may extend generally orthogonally from the body portion; the spacer may be formed of a polymeric and/or plastic material; the spacer may include a fastener portion to secure the spacer to a column tube; the fastener portion may extend from an inner face of the body portion of the spacer; the steering column assembly may include a steering wheel adjustment subassembly; the steering wheel adjustment subassembly may include a lever for manually actuating the steering wheel subassembly; the lever may allow for telescoping adjustment of the steering shaft and/or column tube relative to the column housing; the body portion of the spacer may include an outer face positioned away from the column tube of the steering column assembly; the body portion of the spacer may include an inner face positioned toward an outer surface of the column tube of the steering column assembly; at least a portion of the inner face may contact the outer surface of the column tube; the opposing contact surfaces may engage with a portion of the column tube; the column tube may include one or more features (e.g., a manufacturing extrusion) to engage with the spacer; the feature, such as a manufacturing extrusion, may include one or more raised surfaces, one or more channels for receiving at least a portion of one or more contact surfaces of the spacer, one or more openings for receiving a fastener to secure the spacer to the column tube, or a combination thereof; the one or more openings may receive the fastener portion of the spacer; the column housing may include a longitudinal slot; the opposing contact surfaces of the spacer may engage with walls defining the longitudinal slot in the column housing (e.g., to prevent rotation of the column tube, to provide for smooth telescoping, or both); the spacer may be installed on the column tube prior to the column tube being inserted into the column housing during assembly of the steering column assembly.

Turning now to the drawings, FIGS. 1-3 illustrate a steering column assembly 10 featuring an existing anti-rotational assembly 20 as is known in the art, while FIGS. 4-9 illustrate a steering column assembly 30 and spacer 60 in accordance with the present teachings.

As shown in FIGS. 1 and 2, the steering column assembly 10 includes a column tube 12, having a longitudinal axis $LA_P$, supported by a column housing 14. The column housing 14 includes an opening 16 to allow for installation of the anti-rotational assembly 20 within the steering column assembly. The steering column assembly 10 is secured within a vehicle via one or more bracket structures 18.

FIG. 2 illustrates a cross-sectional view, taken along line A-A of FIG. 1, of the anti-rotational assembly 20 secured to the column tube 12, with the assembly located within the opening 16 of the column housing 14. FIG. 3 illustrates an exploded view of the anti-rotational assembly 20. The anti-rotational assembly 20 includes a steel bolt 22, a plastic spacer 24, a steel spacer 26, and a steel nut bracket 28. As arranged within the steering column assembly, the steel nut bracket 28 is located within the column tube 12 along the inner diameter. The steel spacer 26 is located on the outer diameter of the column tube 12 opposite the steel nut bracket 28. The plastic spacer 24 is located on top of the steel spacer 26. The steel bolt 22 is received within the openings of the plastic spacer 24, steel spacer 26, and steel nut bracket 28, thereby securing the components of the anti-rotational assembly 20 together and to the column tube 12.

The present teachings contemplate a simplified steering column assembly and anti-rotational assembly, as is illustrated in FIGS. 4-9. FIG. 4 illustrates a steering column assembly 30 having a forward end 32 and a rearward end 34. The steering column assembly 30 is mounted within a vehicle using one or more bracket structures 36. The bracket structures 36 support a column housing 50. The column housing 50 receives and supports a column tube 40, which is adapted to telescope fore and aft relative to the column housing along the longitudinal axis $LA_1$. The column tube 40 receives a steering shaft 38, which supports a steering wheel (not shown).

Figure 5:
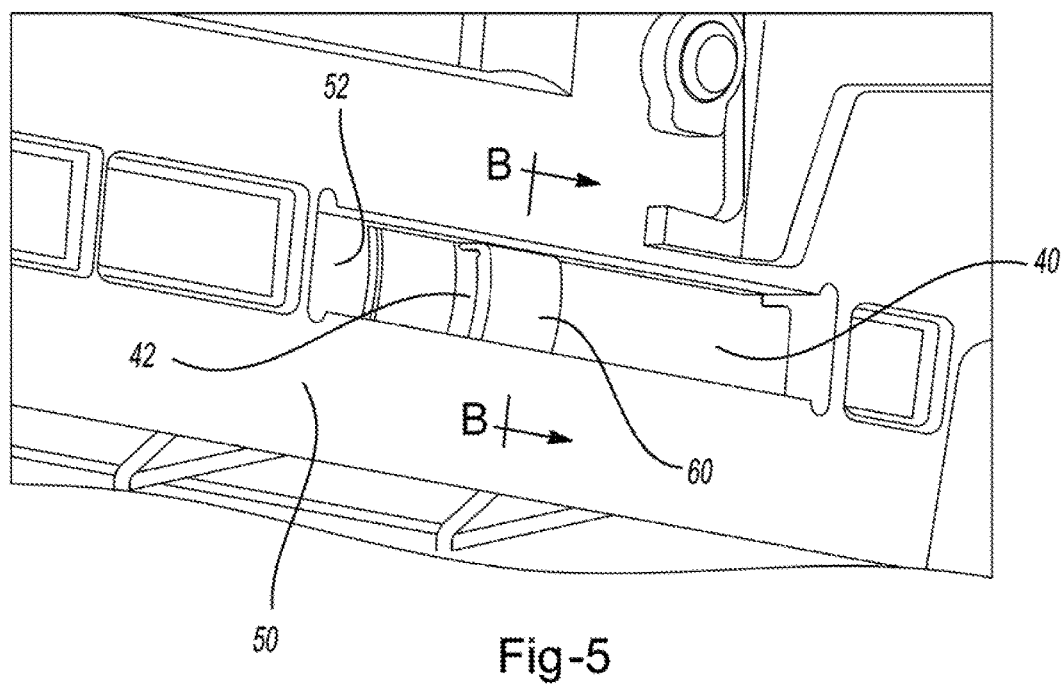
FIG. 5 is an enlarged view of the circled portion of FIG. 4.

FIG. 5 is an enlarged view of the circled portion of FIG. 4. As shown, the column housing 50 includes a slot 52, through which the column tube 40 is visible. A manufacturing extrusion 42 extends from the outer diameter of the column tube 40 into the slot 52. While referred to herein as a manufacturing extrusion for clarity, it is contemplated that any type of projection or extension from the column tube is within the scope of the teachings. Contact between the manufacturing extrusion 42 and the walls defining the slot 52 keeps the column tube 40 from undesirable rotation. Secured to the column tube, and received within the slot 52, is a spacer 60 for providing a smooth telescoping adjustment and/or anti-rotational properties to the column tube. The spacer 60 is situated on at least a portion of the manufacturing extrusion 42.

Figure 6:
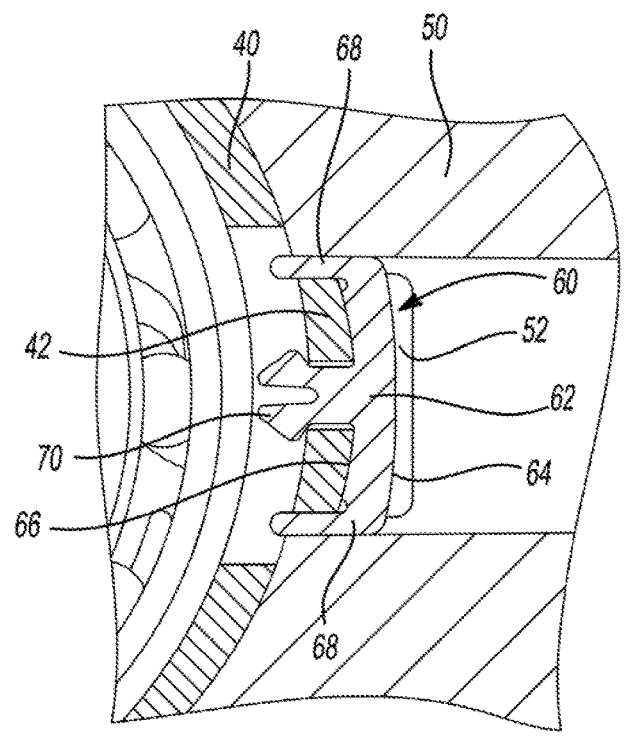
FIG. 6 is a cross-sectional view of the steering column assembly taken along Line B-B of FIG. 5.

FIG. 6 is a cross-sectional view of a portion of the steering column assembly taken along line B-B of FIG. 5, showing the spacer 60 secured within the assembly. The spacer 60 is secured to the column tube 40 at the manufacturing extrusion 42 and received within the slot 52 of the column housing 50. The manufacturing extrusion 42 also extends into the slot 52 to provide additional strength, withstand torque, or both. As shown in both FIGS. 6 and 7, the spacer 60 includes a body portion 62. The body portion 62 includes an outer face 64, facing away from the column tube 40 and an inner face 66 that faces toward and optionally contacts the manufacturing extrusion 42. Two contact surfaces 68 extend from opposing sides of the body portion. The contact surfaces 68 are generally orthogonal to the body portion 62 and extend toward the column tube 40. At least a portion of the contact surfaces 68 are received within channels 44 (see FIG. 8) of the column tube 40. The spacer 60 includes a fastener portion 70 that extends from the inner face 66 of the body portion 62. The fastener portion 70 is received within an opening 46 (see FIG. 8) in the column tube 40 (i.e., at the manufacturing extrusion 42).

Figure 7:
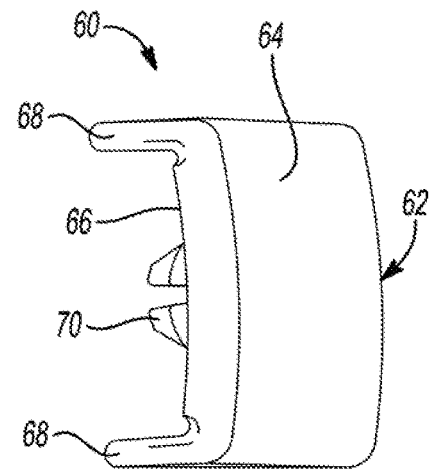
FIG. 7 is an exemplary spacer in accordance with the present teachings.
Figure 8:
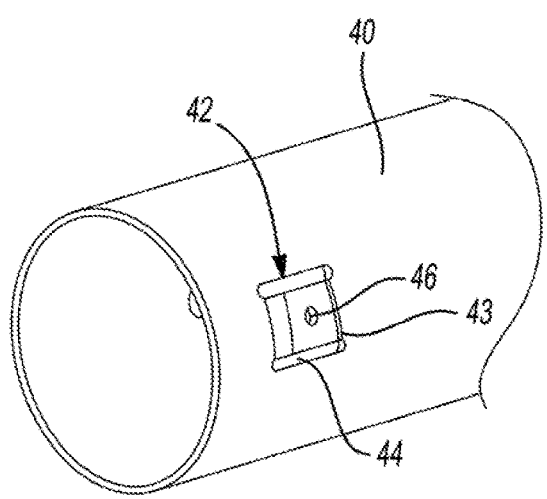
FIG. 8 is an exemplary column tube in accordance with the present teachings.

FIG. 8 illustrates a column tube 40 including a manufacturing extrusion 42 for receiving and supporting the spacer 60 (see FIGS. 6 and 7). The manufacturing extrusion 42 includes one or more raised surfaces 43 and one or more channels 44 for receiving a contact surface 68 of a spacer 60. The manufacturing extrusion 42 includes an opening 46 for receiving a fastener portion 70 of the spacer 60.

Figure 9:
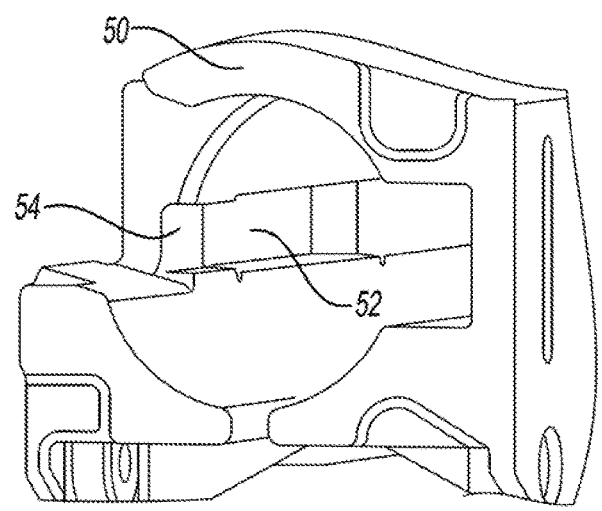
FIG. 9 is an exemplary column housing in accordance with the present teachings.

FIG. 9 illustrates a portion of a column housing 50, showing the slot 52 for receiving the spacer (see FIGS. 6 and 7). The column housing also includes an indentation 54, which allows a spacer 60 to be installed on a column tube 40 prior to installing the column tube 40 within the column housing 50. This allows for ease and/or flexibility in assembly of the steering column assembly.

While exemplary embodiments are described above, it is not intended that these embodiments describe all possible forms of the teachings. Rather, the words used in the specification are words of description rather than limitation, and it is understood that various changes may be made without departing from the spirit and scope of the invention. For example, the spacer may be formed of a single, unitary piece. The spacer may be formed of two or more pieces. The spacer may be formed of a single material. The spacer may be formed of more than one material. The spacer may be integrally formed with the column tube. The spacer may be removable. The spacer may be permanently affixed to the column tube. One or more adhesives, fasteners, clips, rivets, screws, snaps, or the like may be employed to secure the spacer to the column tube. The column tube may instead have a longitudinal slot that engages with a spacer affixed to the column housing. The spacer may take any shape capable of fitting within the longitudinal slot. The spacer may be a pin or rod extending from the column tube.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0,0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30" inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described.

What is claimed is:

1. An adjustable steering column assembly comprising:
   a. a column tube including a manufacturing extrusion extending from an outer diameter of the column tube;
   b. a steering shaft supported for rotation at least in part by the column tube;
   c. a column housing for at least partially supporting the column tube; and
   d. a spacer comprising:
      i. a body portion; and
      ii. two or more opposing contact surfaces extending from the body portion, forming an angle with the body portion; and
      iii. a fastener portion to secure the spacer to the column tube;
   wherein the spacer is positioned on the manufacturing extrusion extending from the outer diameter of the column tube to reduce or prevent rotation of the column tube, in particular during a telescoping adjustment; and
   wherein the fastener portion is received within an opening in the column tube.

2. The steering column assembly of claim 1, wherein the manufacturing extrusion extending from the outer diameter of the column tube is capable of withstanding about 250 Nm or less of torque.

3. The steering column assembly of claim 1, wherein the body portion has a generally curved surface.

4. The steering column assembly of claim 1, wherein the opposing contact surfaces are generally parallel to each other.

5. The steering column assembly of claim 1, wherein the angle formed between one contact surface and the body portion is less than 180 degrees.

6. The steering column assembly of claim 5, wherein the angle formed is about 75 degrees or greater and about 105 degrees or less.

7. The steering column assembly of claim 1, wherein the opposing contact surfaces extend generally orthogonally from the body portion.

8. The steering column assembly of claim 1, wherein the spacer is formed of a plastic material.

9. The steering column assembly of claim 1, wherein the fastener portion extends from an inner face of the body portion of the spacer.

10. The steering column assembly of claim 1, comprising a steering wheel adjustment subassembly including a lever for manually actuating the steering wheel adjustment subassembly, and wherein the lever allows for telescoping adjustment of the steering shaft and/or column tube relative to the column housing.

11. The steering column assembly of claim 1, wherein the body portion of the spacer includes an outer face positioned away from the column tube of the steering column assembly.

12. The steering column assembly of claim 1, wherein the body portion of the spacer includes an inner face positioned toward an outer surface of the column tube of the steering column assembly.

13. The steering column assembly of claim 12, wherein at least a portion of the inner face contacts an outer surface of the manufacturing extrusion extending from the outer diameter of the column tube.

14. The steering column assembly of claim 1, wherein the opposing contact surfaces engage with a portion of the column tube of the steering column assembly.

15. The steering column assembly of claim 1, wherein the manufacturing extrusion extending from the outer diameter of the column tube includes one or more channels for receiving at least a portion of one or more contact surfaces of the spacer.

16. The steering column assembly of claim 1, wherein the opening in the column tube is part of the manufacturing extrusion extending from the outer diameter of the column tube for receiving the fastener portion to secure the spacer to the column tube.

17. The steering column assembly of claim 1, wherein the column housing includes a longitudinal slot.

18. The steering column assembly of claim 17, wherein the manufacturing extrusion extending from the outer diameter of the column tube is received within the longitudinal slot and extends into the slot to reduce or prevent rotation of the column tube within the steering column assembly.

19. The steering column of claim 17, wherein the longitudinal slot is configured in such a way that the manufacturing extrusion extending from the outer diameter of the column tube can be installed within the longitudinal slot but when the spacer is assembled on the column tube, the column tube cannot pass back through at forces of about 3 kN or less to prevent column pull apart.

20. The steering column assembly of claim 17, wherein the opposing contact surfaces of the spacer are adapted to contact walls defining the longitudinal slot in the column housing and at least parts of the manufacturing extrusion extending from the outer diameter of the column tube.

* * * * *